United States Patent
Deros et al.

(10) Patent No.: US 10,736,176 B2
(45) Date of Patent: Aug. 4, 2020

(54) SYSTEMS AND METHODS FOR CONSERVING GUEST ROOM RESOURCES AND UTILITIES USING INTERNET OF THINGS DEVICES

(71) Applicant: ATOM, Inc., Scottsdale, AZ (US)

(72) Inventors: Yani Deros, Phoenix, AZ (US); Jodi Deros, Phoenix, AZ (US)

(73) Assignee: ATOM, Inc., Scottsdale, AZ (US)

( * ) Notice: Subject to any disclaimer, the term of this patent is extended or adjusted under 35 U.S.C. 154(b) by 0 days.

(21) Appl. No.: 16/163,186

(22) Filed: Oct. 17, 2018

(65) Prior Publication Data
US 2019/0053329 A1     Feb. 14, 2019

Related U.S. Application Data

(63) Continuation of application No. 15/793,982, filed on Oct. 25, 2017, now Pat. No. 10,111,277, which is a continuation-in-part of application No. 15/636,546, filed on Jun. 28, 2017, now Pat. No. 10,383,170, which is a continuation-in-part of application No. 15/586,191, filed on May 3, 2017, now Pat. No. 10,021,801, which is a continuation of application No. 14/622,850, filed on Feb. 14, 2015.
(Continued)

(51) Int. Cl.
| | |
|---|---|
| H04W 84/12 | (2009.01) |
| H02J 50/80 | (2016.01) |
| H01R 31/06 | (2006.01) |
| H04W 4/00 | (2018.01) |
| H04W 4/021 | (2018.01) |
| H04W 4/70 | (2018.01) |
| H02J 50/20 | (2016.01) |
| H01R 27/00 | (2006.01) |
| H01R 13/66 | (2006.01) |

(52) U.S. Cl.
CPC .......... *H04W 84/12* (2013.01); *H01R 31/065* (2013.01); *H02J 50/80* (2016.02); *H04W 4/00* (2013.01); *H04W 4/021* (2013.01); *H04W 4/70* (2018.02); *H01R 13/6675* (2013.01); *H01R 27/00* (2013.01); *H02J 50/20* (2016.02)

(58) Field of Classification Search
CPC ......... H04W 84/12; H02J 50/80; H02J 50/20; H01R 31/065; H01R 13/6675; H01R 27/00
See application file for complete search history.

(56) References Cited

U.S. PATENT DOCUMENTS

| | | |
|---|---|---|
| 6,121,695 A | 9/2000 | Loh |
| 6,447,357 B1 | 9/2002 | Pearl |

(Continued)

OTHER PUBLICATIONS

International Search Report, PCT/US18/40107 dated Sep. 24, 2018; 4pgs.
Written Opinion, PCT/US18/40107 dated Sep. 24, 2018; 5pgs.

*Primary Examiner* — Chandrahas B Patel
(74) *Attorney, Agent, or Firm* — Jennings, Strouss & Salmon PLC; Michael K. Kelly; Daniel R. Pote

(57) ABSTRACT

An IOT module includes a thermostat controller operable by the user to remotely (e.g., wirelessly) control the state of the relay which, in turn, operates the PTAC/HVAC unit in much the same way (typically a wired connection) as the wall mounted thermostat previously did so before being replaced (or augmented) by the relay.

17 Claims, 16 Drawing Sheets

Wireless Charging Pad

Related U.S. Application Data

(60) Provisional application No. 61/940,160, filed on Feb. 14, 2014.

(56) References Cited

U.S. PATENT DOCUMENTS

| | | |
|---|---|---|
| 8,549,658 B2 | 10/2013 | Kolavennu et al. |
| 9,060,197 B2 | 6/2015 | Warrick |
| 9,080,782 B1 | 7/2015 | Sheikh |
| 10,349,236 B2 * | 7/2019 | O'Donnell ............. H04W 4/02 |
| 2002/0089820 A1 | 7/2002 | Abboud |
| 2003/0007321 A1 | 1/2003 | Dayley |
| 2007/0072474 A1 | 3/2007 | Beasley et al. |
| 2007/0079042 A1 | 4/2007 | Crosswy et al. |
| 2012/0172027 A1 | 7/2012 | Partheesh et al. |
| 2015/0130270 A1 | 5/2015 | Peto |
| 2016/0241999 A1 | 8/2016 | Chin et al. |
| 2016/0374413 A1 | 12/2016 | Kweon et al. |

* cited by examiner

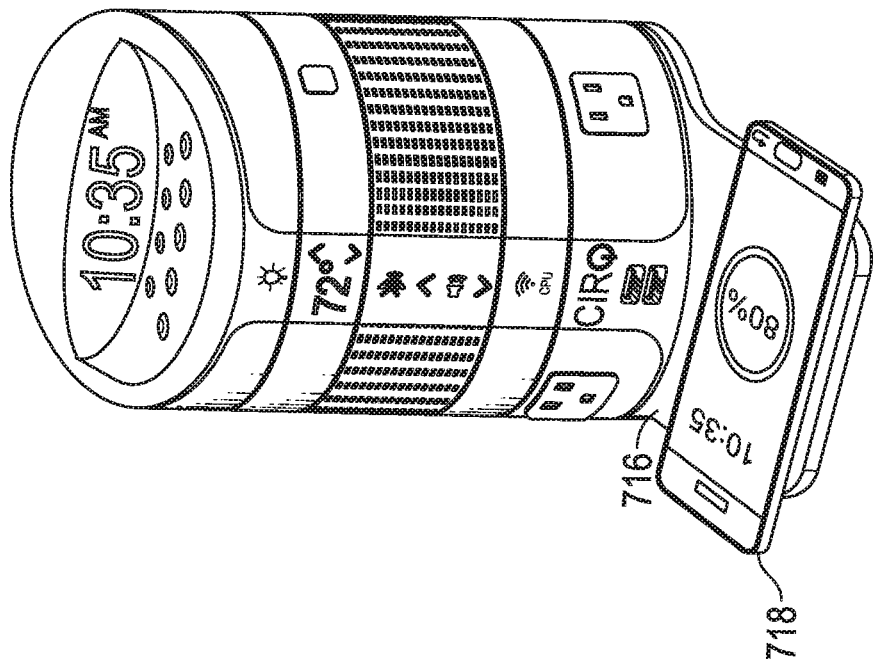
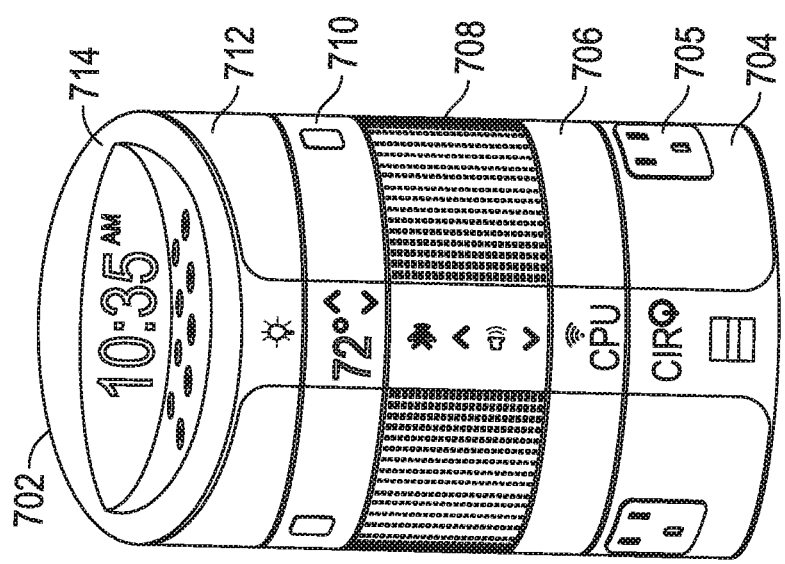
FIG. 7

SYSTEMS AND METHODS FOR CONSERVING GUEST ROOM RESOURCES AND UTILITIES USING INTERNET OF THINGS DEVICES

CROSS-REFERENCE TO RELATED APPLICATIONS

This application claims priority to and is a continuation of U.S. patent application Ser. No. 15/793,982 filed Oct. 25, 2017, which claims priority to and is a continuation-in-part of U.S. patent application Ser. No. 15/636,546 filed Jun. 28, 2017, which claims priority to and is a continuation-in-part of U.S. patent application Ser. No. 15/586,191 filed May 3, 2017, published as US2017/0238436, which claims priority to and is a continuation of U.S. patent application Ser. No. 14/622,850 filed Feb. 14, 2015, which claims priority to and the benefit of U.S. provisional patent application Ser. No. 61/940,160 filed Feb. 14, 2014, the entire contents of all the above mentioned applications are hereby incorporated herein by reference.

FIELD OF THE INVENTION

The present invention relates, generally, to a Platform as a Service (PaaS) solution that includes a modular electronics system for interfacing with and controlling internet-of-things (IOT) devices in a hotel room, timeshare or rental property to improve guest experiences while reducing energy and resource consumption. More particularly, the invention provides an associated mobile application (referred to herein as an "app") running on a mobile device to motivate guests to permit the mobile app to track guest location, habits, routines, patterns and behavior, both on and off the premises to thereby facilitate customizing the user experience and developing targeted and customized marketing and messaging programs with contextual awareness of the guest's activities. In this context, services, energy and resource consumption includes utilities such as water, electricity, natural gas, geothermal or other energy sources, labor, consumable products, reusable products such as linens, towels, toiletries, and other amenities.

BACKGROUND

Most major hotel chains, property brokers, timeshare companies and aggregators offer a proprietary rewards mobile application (referred to herein as a mobile app) to their members, including loyalty programs promoted by Wyndham Rewards™, Marriott™, Choice™ Hotels, Hotels.com, the Ritz-Carlton™, Hilton Honors™, Hotels.com™, InterContinental Hotels Group (IHG™), Hyatt, and Starwood Preferred Guest (SPG™). However, adoption has been sluggish because downloading and configuring the app is perceived to be cumbersome and time consuming. User engagement is further limited due to consumer resistance to location services arising out of privacy concerns. Succinctly, current value propositions are insufficient to persuade consumers to enable location services running on loyalty program mobile apps.

GPS and other tracking/location services capable of being implemented on laptop computers, tablets, smart phones, headsets, wearable devices and accessories have achieved wide acceptance, particularly when used to provide driving directions and other travel related navigation assistance. Additionally implantable electronic sensing devices will become integrated into humanity and the application of use. However, the aggregate location data is difficult to effectively harness for marketing purposes because it typically lacks context; that is, simply knowing where a person is or has been is of limited value unless the system also has a sense of why that person is there.

Systems and methods are thus needed which overcome these limitations.

BRIEF SUMMARY

In particular, there is a need for a PaaS solution combined with (or including) an in-room IOT control system which may be controlled by a loyalty mobile app or service campaign, and which tracks guest location, interests, feedback and needs to thereby enable customized guest experiences and targeted marketing programs informed by contextual awareness, such as whether the guest is travelling for business or pleasure as well as personal preferences that can be migrated from property to property.

To achieve the foregoing and other objectives in accordance with the present invention as broadly described herein, various embodiments comprise: i) a hotel-wide or enterprise-wide PaaS system; ii) a room based IOT network including a base module configured to control a plurality of peripheral network devices (e.g., lights, television, router, radio, telephone, shades, water, thermostat) or embedded building infrastructure sensor solution; iii) a mobile app which is separately downloadable or embedded within an existing hotel brand app running on the guest's mobile device, the app configured to interface with and control the IOT network and coordinate hotel services; iv) a location tracking service managed by the app and configured to monitor the location of the guest on and/or off the hotel property; and v) an analytics and/or machine learning engine configured to augment the location data with contextual awareness, to thereby facilitate enhanced customization of the guest experience and transmit targeted marketing messages to the guest (e.g., in in real time) to generate additional revenue channels for the property; vii) configuring the PaaS system to deliver an Application Program Interface (API) allowing the hotel property manager to monitor and control the IOT devices to reduce power and water usage within each hotel room independently or within a select property space conveniently and effectively to yield additional cost savings for utilities throughout the facility; viii) wirelessly controlling room temperature through a controller positioned within a bedside module; ix) thermal mapping and motion mapping using multiple sensors within a guest room; x) promoting conservation through gamification coupled with a loyalty rewards component; xi) migration of guest personal preferences that can move from property to property and xii) configuring the API to offer hotel managers the ability to set thresholds or limits to thereby track and manage utility usage within each hotel room and other areas on the property.

In an embodiment, the IOT control system comprises a base unit adapted for electrical communication with a high voltage power source, and a plurality of stacked electronic modules adapted for wirelessly receiving communications from the base including high voltage power, low voltage DC power, data, and control signals.

Each stacked electronic module may be configured to communicate with, monitor, embody, interface with and/or control one or more of the following IOT devices: computing and communication devices for facilitating hotel services such as room service and concierge services, electronic card readers, hard drives, lamps, batteries, speakers, clocks, fans, pencil sharpeners, cup holders, staplers, mug warmers, stock tickers, displays, personal computers, electric staplers, tape dispensers, pencil holders, game controllers, wireless chargers, post-it note dispensers, coffee makers, refrigerators, web cameras, wireless receivers, wireless transmitters, Blue ray/CVD/CD/disk drives, baby monitors, air fresheners, mobile device stands, air ionizers, motion sensors, power interfaces, laptop and smart phone docking and charging stations, home controls, game controllers, thermostats, fire alarm/smoke/CO detectors, gestural interfaces, numeric/calculator pads, scanners, eye tracking devices, flash drives, wireless pads/styluses wireless mouses, wireless keyboards, wireless charging stations, web cameras, wireless receivers, wireless transmitters, battery power sources, IO panel/instrument jack, spare plug outlets (similar to a power strip), wireless headphone transmitters, auxiliary interfaced or wireless screens/displays, credit/debit card chip and magnetic stripe readers, HVAC systems, displays, personal computers, shade, blind, and other window covering controllers, door and window locks, faucets, showers, toilets, sinks, water leak detectors, and combinations thereof.

In various embodiments the hotel guest may be incented to enable location, proximity and personalization services in exchange for a downloadable mobile app for remotely controlling the in-room IOT control module that in turn controls the immediate room environment, as well as discounts, enhanced services, gaming points, and other perks and rewards which may be derived from the location data alone or augmented with contextual awareness.

In the context of this disclosure, the terms hotel and property may also contemplate motels, apartment complexes, timeshares, or any other type of residence.

By way of non-limiting example, contextual awareness may include "knowing" that the guest is primarily or currently attending to business or pleasure, the guest's short term and/or long term itinerary, the guest's previous locations (conference room, restaurant, office building, movie theater), and unique user preferences relating to cuisine, entertainment, lifestyle, music, and environmental comfort metrics such as lighting, room temperature, mattress firmness, and the like. Additional contextual awareness metrics may include monitoring when location data goes dark, and thereafter re-emerges in another city, suggesting that the guest has flown from one city to another.

Additionally the PaaS system may be configured to learn guest habits, routines and preferences to intelligently (e.g., algorithmically) prepare the hotel room to accommodate desired environmental factors including temperature, lighting, window shade position, entertainment, and consumable items such as beverages and food that would deliver an inviting and welcoming room presence to drive loyalty for the property and brand.

BRIEF DESCRIPTION OF THE DRAWING FIGURES

These and other features, aspects, and advantages of the present invention will become better understood with reference to the following description, appended claims, and accompanying drawings, where:

FIG. 7 is a more detailed view of the base module in accordance with various embodiments;

DETAILED DESCRIPTION OF PREFERRED EXEMPLARY EMBODIMENTS

Figure 1:
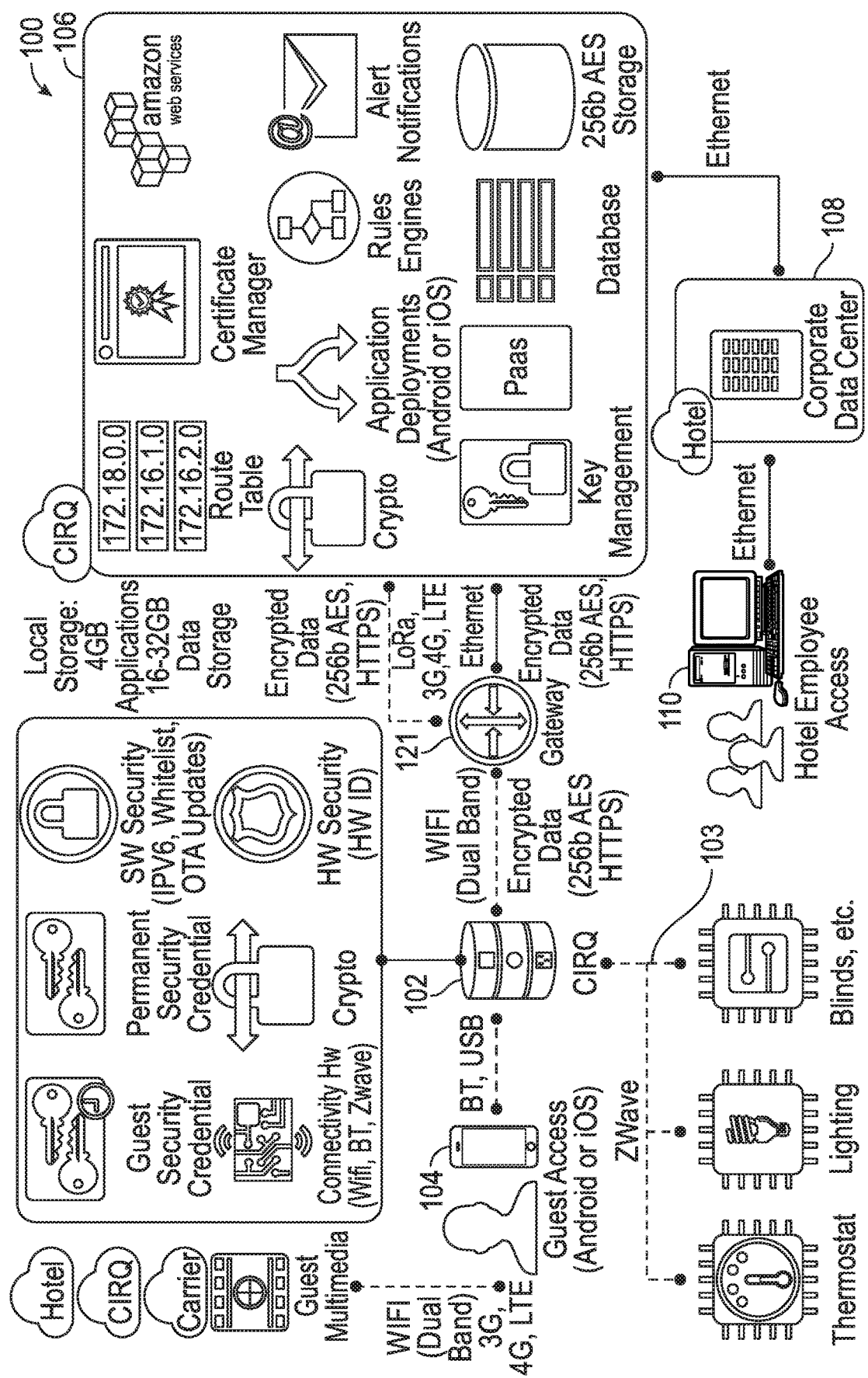
FIG. 1 is a schematic diagram of an enterprise level system for providing enhanced customization to a guest experience using a PaaS System with an in-room IOT module and an associated mobile app and API both configured to augment tracking data with contextual awareness in accordance with various embodiments.

Presently known mobile apps for controlling IOT devices offer a limited value proposition to the user, and are typically limited to consolidating multiple end point assets (e.g., lighting, door locks, HVAC) into a central hub. In contrast, the present system offers a more robust value proposition to the guest user in the form of enhanced control of the user experience, amenity upgrades, rewards, personalization preferences and targeted/push marketing messages, offers and notices as well as enabling features (both on and off property) that would otherwise be unavailable without location services enabled.

Various embodiments contemplate monitoring the guest's location using the guest's mobile phone, wearable accessory, laptop, or any other GPS or location-enabled device. In this way, location aware (and hence context aware) features and services may be pushed to the guest in new and imaginative ways heretofore not contemplated by existing systems. Moreover, by incenting the guest to keep location services enabled even when the guest is off the hotel property, valuable tracking information may be collected, mined, and harvested to design precisely designed marketing messages delivered with pinpoint accuracy. An additional benefit of collecting aggregate location data surrounds the ability to conduct advanced analytics, and to offer customized guest benefits with guest room and property wide preferences based on these analytics.

From an enterprise standpoint, the system contemplates at least the following levels of value proposition: i) allowing the property to offer guests the ability to control and manage a plurality of IOT devices in the room using a mobile app, with low hardware and installation costs; ii) wirelessly controlling room temperature through a controller mounted within a bedside module; iii) thermal mapping and motion mapping using multiple sensors within a guest room; iv) promoting conservation through gamification coupled with a loyalty rewards component; v) providing the guest with perks and other features which leverage location services (tracking); vi) mining the resulting aggregate location data facilitates the development of enhanced targeted marketing programs; and vii) allowing the hotel property the ability to substantially reduce power and water usage within each room. Viii) the ability to migrate personal environmental and personal preferences from property to property.

The value proposition to the guest includes providing enhanced information to the mobile device thru the mobile app regarding the environment within and outside the room. In various embodiments, this involves a cloud based system server (sometimes referred to herein as the CIRQ server) operating within the broader internet environment to thereby integrate the immediate environment (guest room) with the extended environment (the resort property, nearby attractions, and remote attractions).

In various embodiments, the in-room IOT control module is used to drive initial user engagement including downloading the mobile app and enabling location services, whereupon the resulting location awareness (tracking) may be used to drive further user engagement (e.g., on and off property perks, targeted and push marketing). Aggregate tracking data from multiple users may then be mined and harnessed to drive further targeted marketing notices, offers, messages, schemes, energy savings, and to analyze travel and spending trends. Indeed, the intersection among the PaaS System with in-room IOT control and location awareness alone has significant value in terms of energy savings for the property owner, as described below.

In addition, the system may be configured to gather performance data for the IOT devices and appliances, failure modes and trends, lifetime usage, servicing cycles/predictions and duty cycles in multiple geographic locations to thereby reduce long term total cost of use, increasing revenue/profit for the PaaS System and driving capital equipment replacement and upgrade timetables for property owners.

Turning now to FIG. 1, a system 100 for providing enhanced customization to a guest experience includes an in-room IOT module 102 for controlling a local IOT network 103, an associated mobile app running on a guest mobile device 104, an enterprise server 106 including a PaaS platform, and a property owner server 108 configured to communicate with a facilities controller 110.

More particularly, the IOT module 102 is configured to communicate with the guest device 104 using Wi-Fi, Bluetooth, wired or wireless Ethernet, VPN, USB, Zippy, Z-Wave, cellular (3G, 4G), or any other suitable wired or wireless protocol. The IOT module 102 is configured to communicate with the devices which comprise the IOT network 103 using ZWave, Bluetooth, or any suitable wired or wireless protocol. The IOT module 102 is configured to communicate with the enterprise server 106 through a gateway 121 (such as the internet) using Wi-Fi, LoRa, 3G, 4G, LTE, Ethernet, or any suitable wired or wireless protocol. Similarly, the enterprise server 106 is configured to communicate with the property owner server 108 using Wi-Fi, LoRa, 3G, 4G, LTE, Ethernet, or any suitable wired or wireless protocol.

In a typical use case, the guest device 104 communicates directly with the IOT module 102 when the guest device 104 is inside or otherwise closely proximate the hotel room. When the guest is outside the hotel room, off the hotel premises, or otherwise out of range of the IOT module 102, the guest device 104 communicates directly with the enterprise server 106 using a cellular network (e.g., 3G, 4G, LTE) or through a suitable wired or wireless internet connection.

Figure 2:
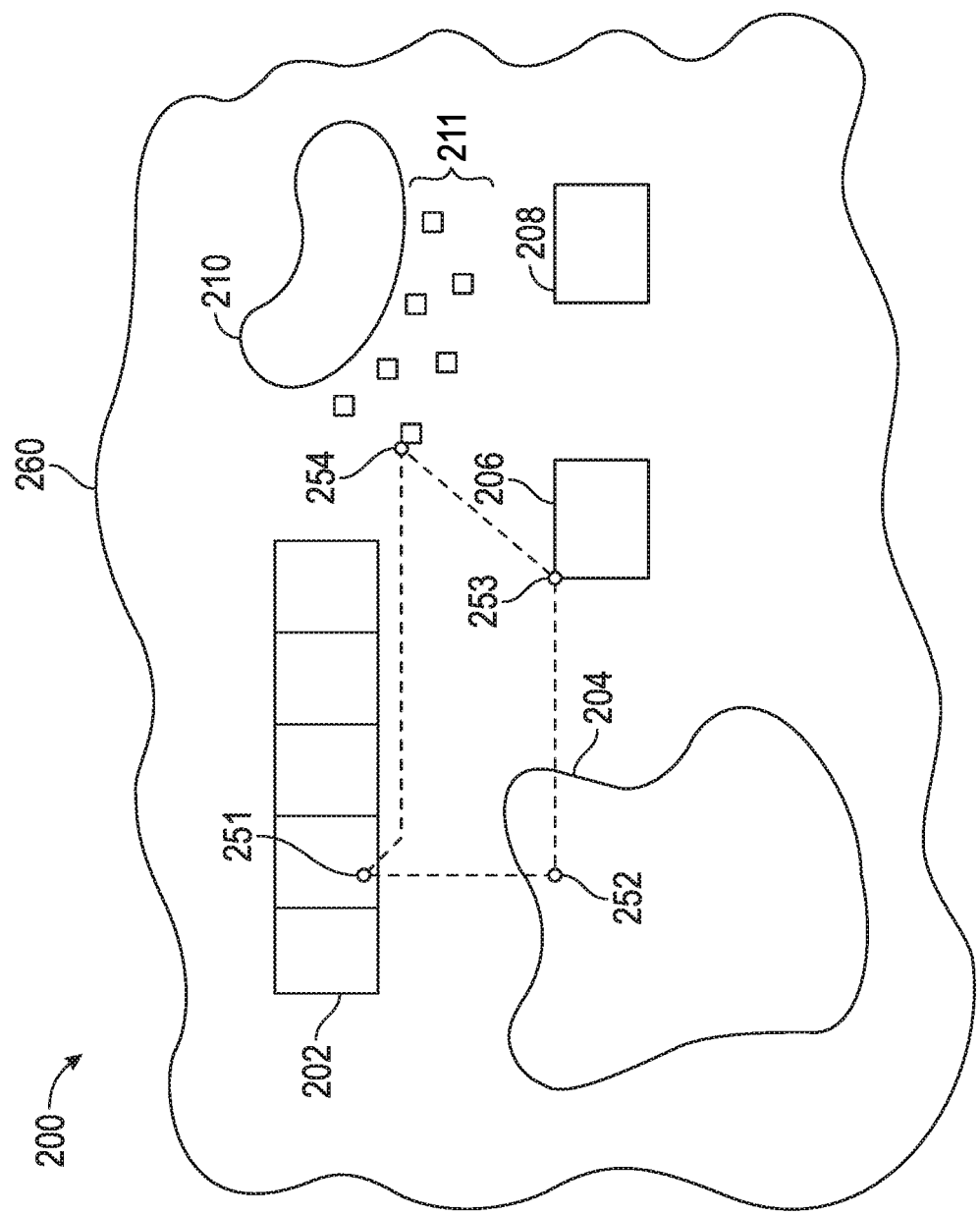
FIG. 2 is a schematic diagram of a hotel property illustrating tracking data for a hotel guest within the boundary of the hotel property in accordance with various embodiments.

FIG. 2 is a schematic diagram of a hotel property 200 illustrating tracking data for a hotel guest within the boundary of the hotel property. In the illustrated example, the mobile app tracks the guest's movement from a guest room 202 (point 251), to golf course (point 252), to a restaurant 206 (point 253), to a particular one of a plurality of cabanas 211 adjacent a pool 210 (point 254), and back to the room (point 251). A geo-fence 260 defines the boundary of the hotel, resort, or time share property.

Figure 3:
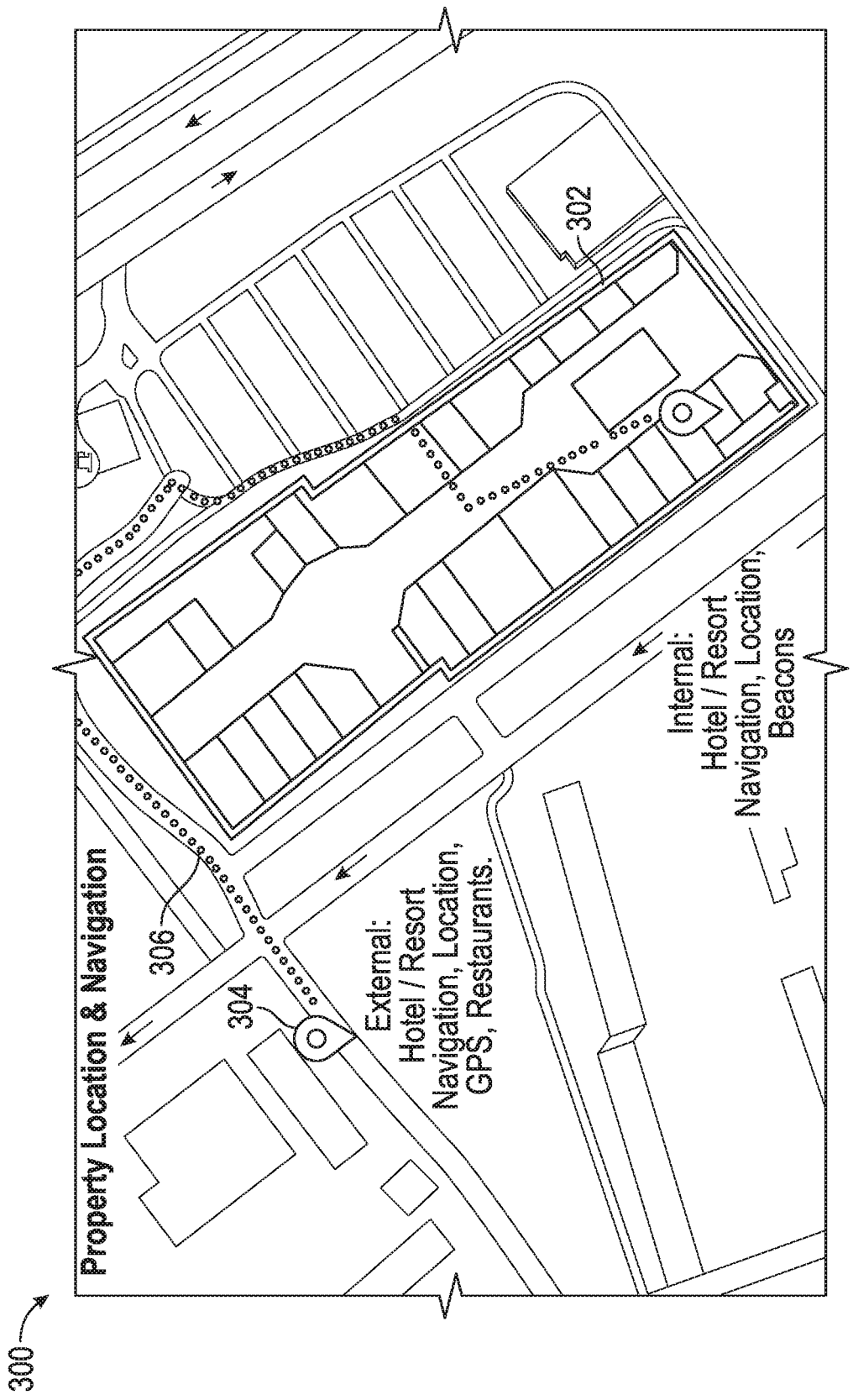
FIG. 3 is a schematic diagram illustrating tracking data for a hotel guest within and outside the boundary of the hotel property with cellular or area Wi-Fi in accordance with various embodiments.

FIG. 3 is a schematic diagram illustrating tracking data 306 for a hotel guest within and outside the boundary 302 of a hotel property as the guest visits an off premises location 304 (tourist attraction, restaurant, office, theater, or the like).

Figure 4:
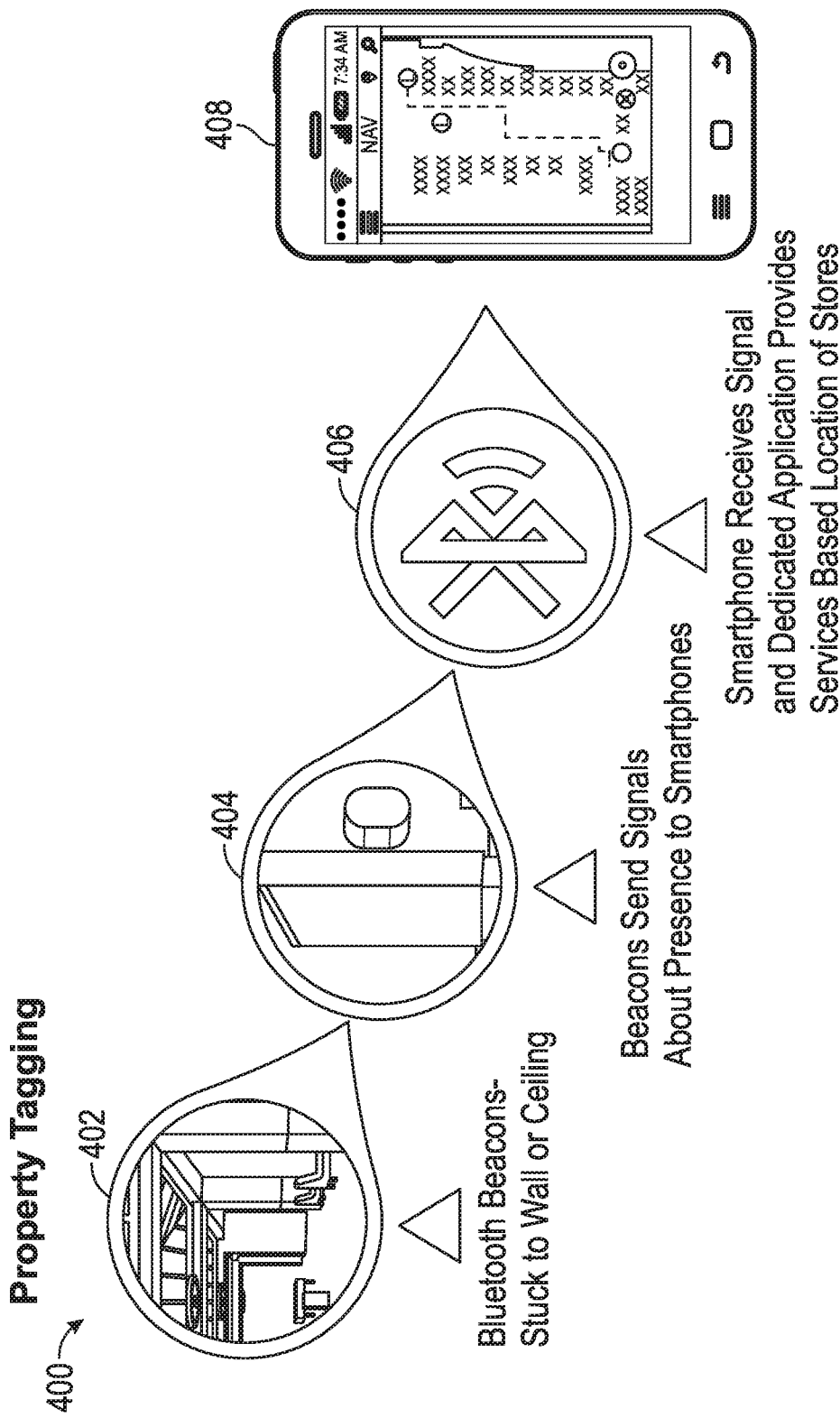
FIG. 4 is a schematic diagram illustrating the use of beacons in addition to and/or in lieu of traditional GPS based location services in accordance with various embodiments.

FIG. 4 is a schematic diagram illustrating the use of beacons in addition to and/or in lieu of traditional GPS based location services. More particularly, FIG. 4 depicts a hallway 402 including wall mounted beacons or embedded building or infrastructure sensors. Each beacon 404 is configured to send static location information to the mobile app using Bluetooth or similar protocols 406. In this way, even without enabling location services, the mobile app can display the locations of various hotel amenities on the mobile device screen 408.

Figure 5:
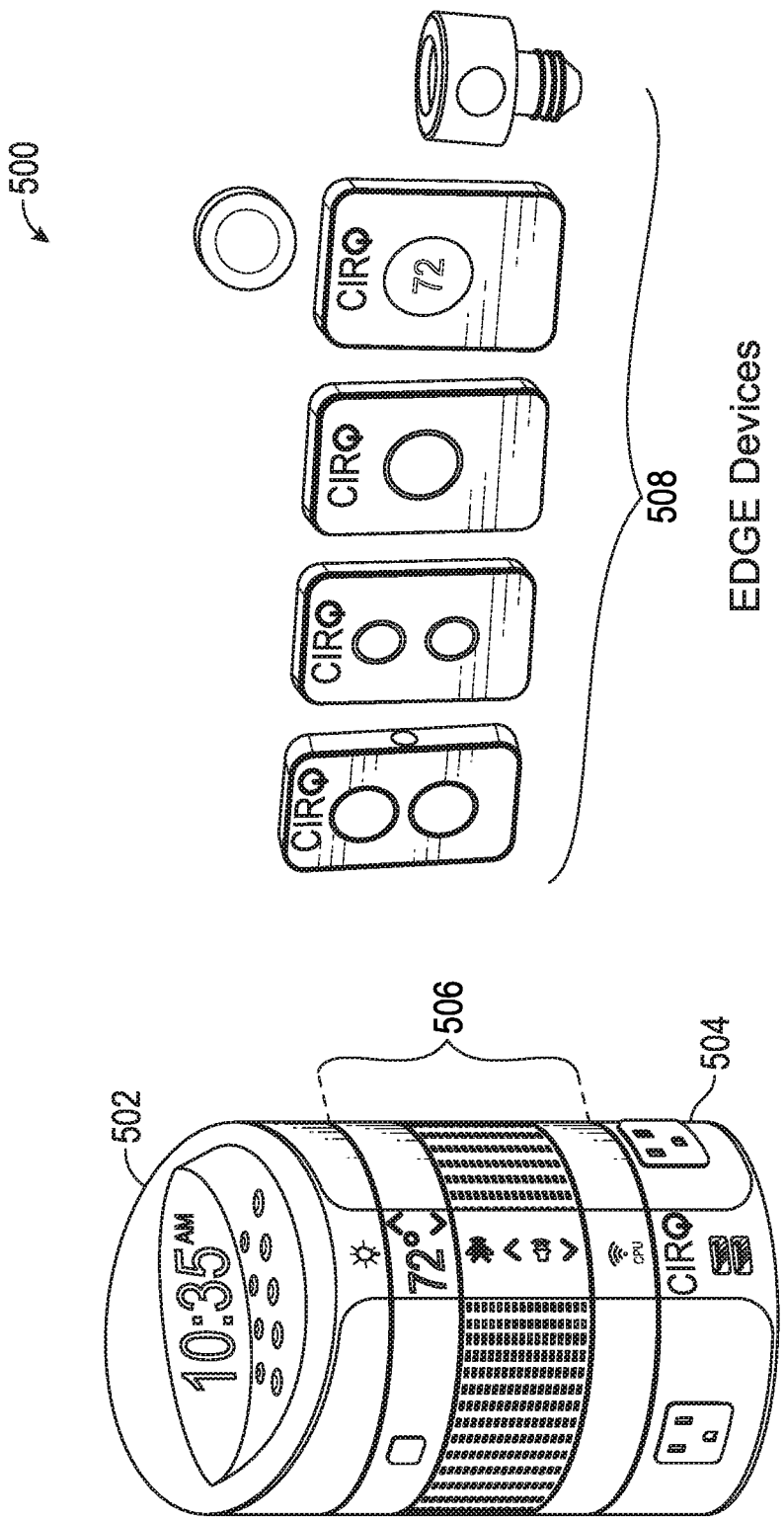
FIG. 5 is a schematic diagram of an exemplary in room IOT network that is part of a unified PaaS system including a base module and a plurality of edge devices in accordance with various embodiments.

Referring now to FIGS. 1 and 5, an exemplary PaaS system with an in-room IOT network system controller 500 includes a control module 502 and a plurality of IOT devices (referred to herein as Edge devices) 508. In particular, the control module 502 includes a base 504 and a plurality of stacked electronic modules 506, each of which is configured to communicate with, monitor, and/or control one or more of the edge devices.

Figure 6:
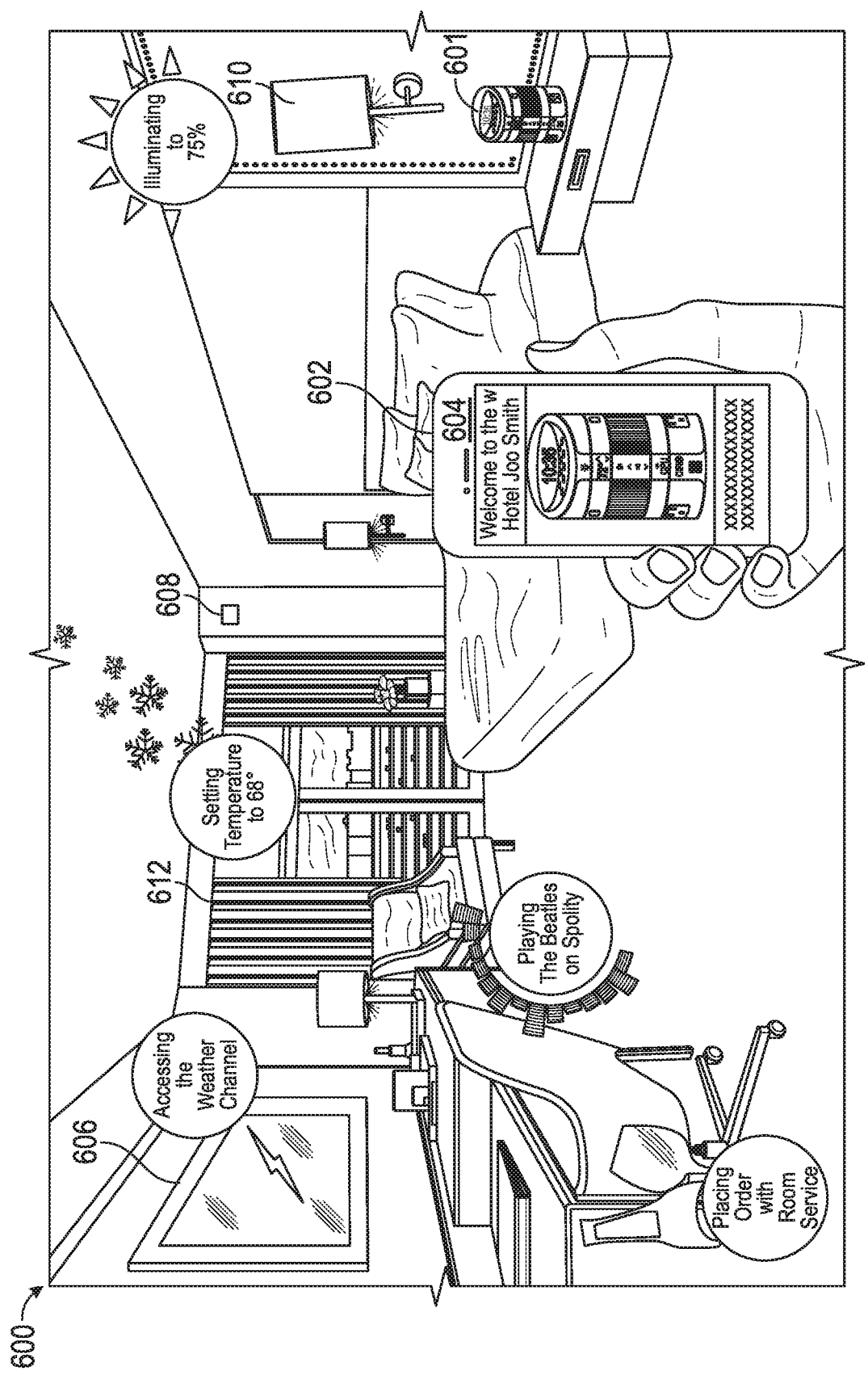
FIG. 6 is a schematic diagram illustrating a mobile app operating on a mobile device and controlling a plurality of IOT devices in accordance with various embodiments.

FIG. 6 is a schematic diagram illustrating a mobile device 602 operating a mobile app 604 for controlling an IOT module 601 which, in turn, coordinates a plurality of IOT devices such as, for example, an entertainment system (e.g., television) 606, a thermostat or other HVAC controller 608, lighting 610, motorized window coverings 612, and a services module 614 for coordinating resort amenities (e.g., room service, reservations for local restaurants and tourist attractions).

FIG. 7 is a more detailed view of an exemplary IOT control module 702 including a base 704 having one or more female AC adapters 705, and a CPU module 706 including a Wi-Fi component, a ZigBee Multi-Band IoT Mesh Network Technology component, and/or a hard drive component. The control module 702 further includes an audio module 708 including a speaker and/or microphone component, a sensor module 710 including a remote thermostat module with thermo-sensors and ultrasonic sensors and a motion and/or infrared sensor module, a smart LED module 712, and a utility module 714 including a digital alarm clock, a radio, and an optional mobile docking/charging station. An alternative embodiment of a mobile docking/charging station 716 is shown charging a smart phone 718.

Figure 8:
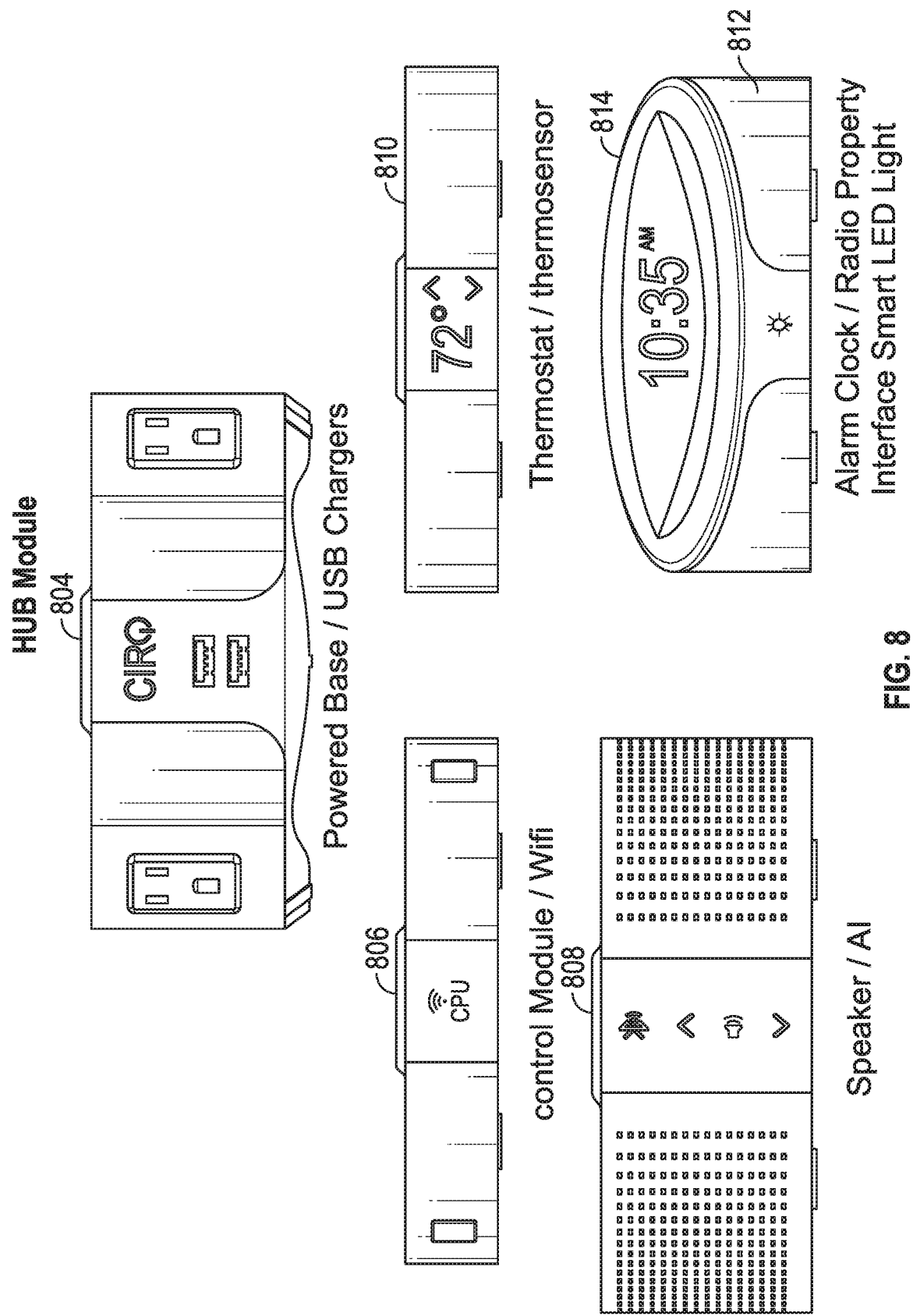
FIG. 8 is a schematic view of the stackable electronic hub modules shown in FIG. 7 in accordance with various embodiments.

FIG. 8 is a schematic view of the stackable electronic hub modules shown in FIG. 7, including a base module 804, a CPU module 806, an audio module 808, a remote thermostat and occupancy/thermo-sensor module 810, a lighting module 812, and a utility module 814.

Figure 9:
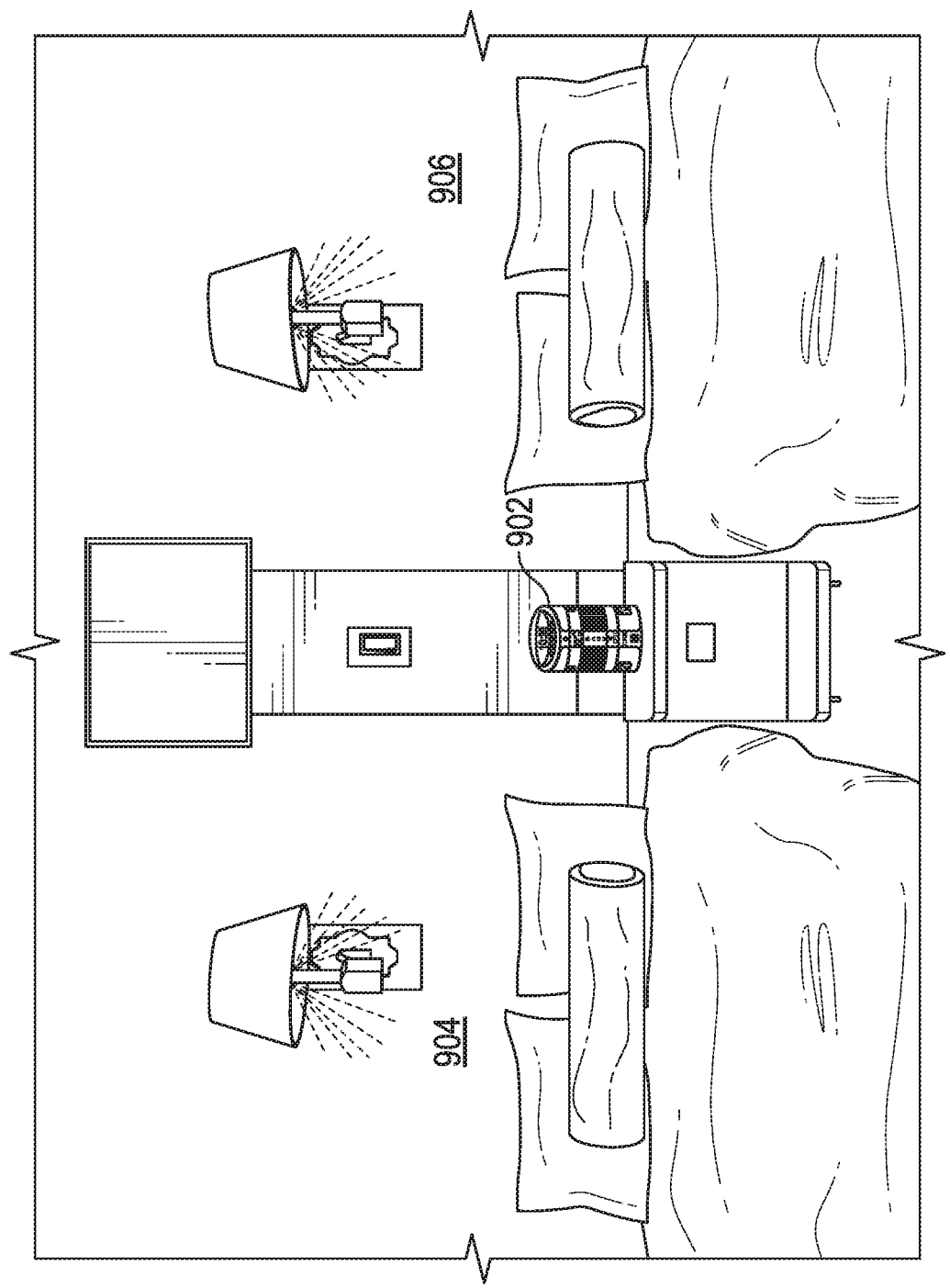
FIG. 9 is a schematic view of a base module disposed between two beds in a typical hotel, resort, or time share environment in accordance with various embodiments.

FIG. 9 is a schematic view of an IOT controller 902 disposed between a first bed 904 and a second bed 906 in a typical hotel, resort, or time share room environment. In the illustrated embodiment, the modular stack that includes a remote thermostat with the motion and/or infrared sensors (not shown) may be positioned so that full room coverage may be obtained using a minimum number of sensors (e.g., 2). Additionally by having the remote thermostat bedside the guest will be able to adjust the temperature controls on the remote thermostat or mobile app without leaving the bed.

Figure 10:
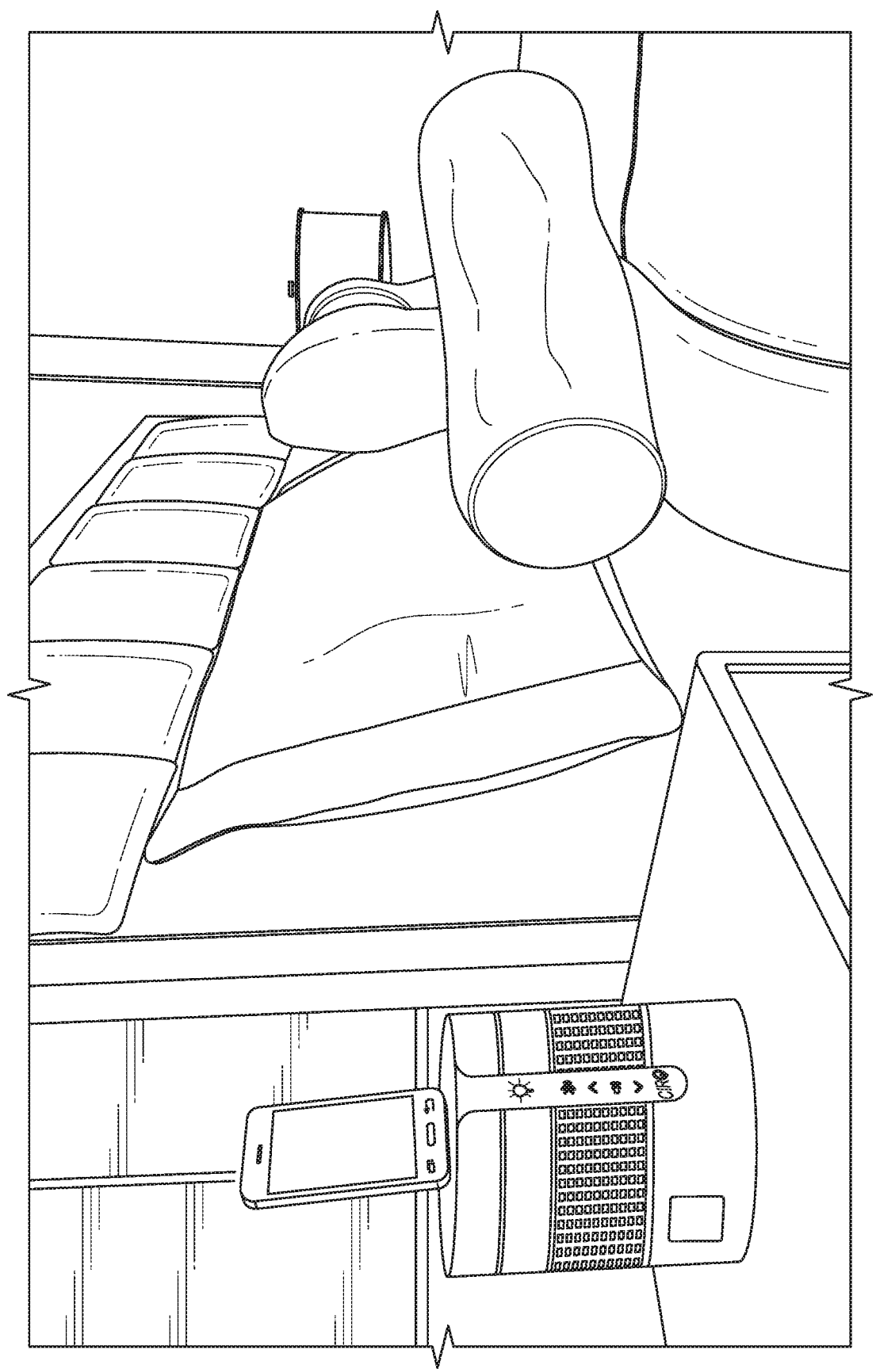
FIG. 10 is a schematic view of a base module disposed bedside, illustrating a smart phone charging station in accordance with various embodiments.

FIG. 10 is a schematic view of an alternative embodiment of an IOT control module disposed on a bedside table, illustrating a smart phone charging station on a top surface of the IOT control module.

Figure 11:
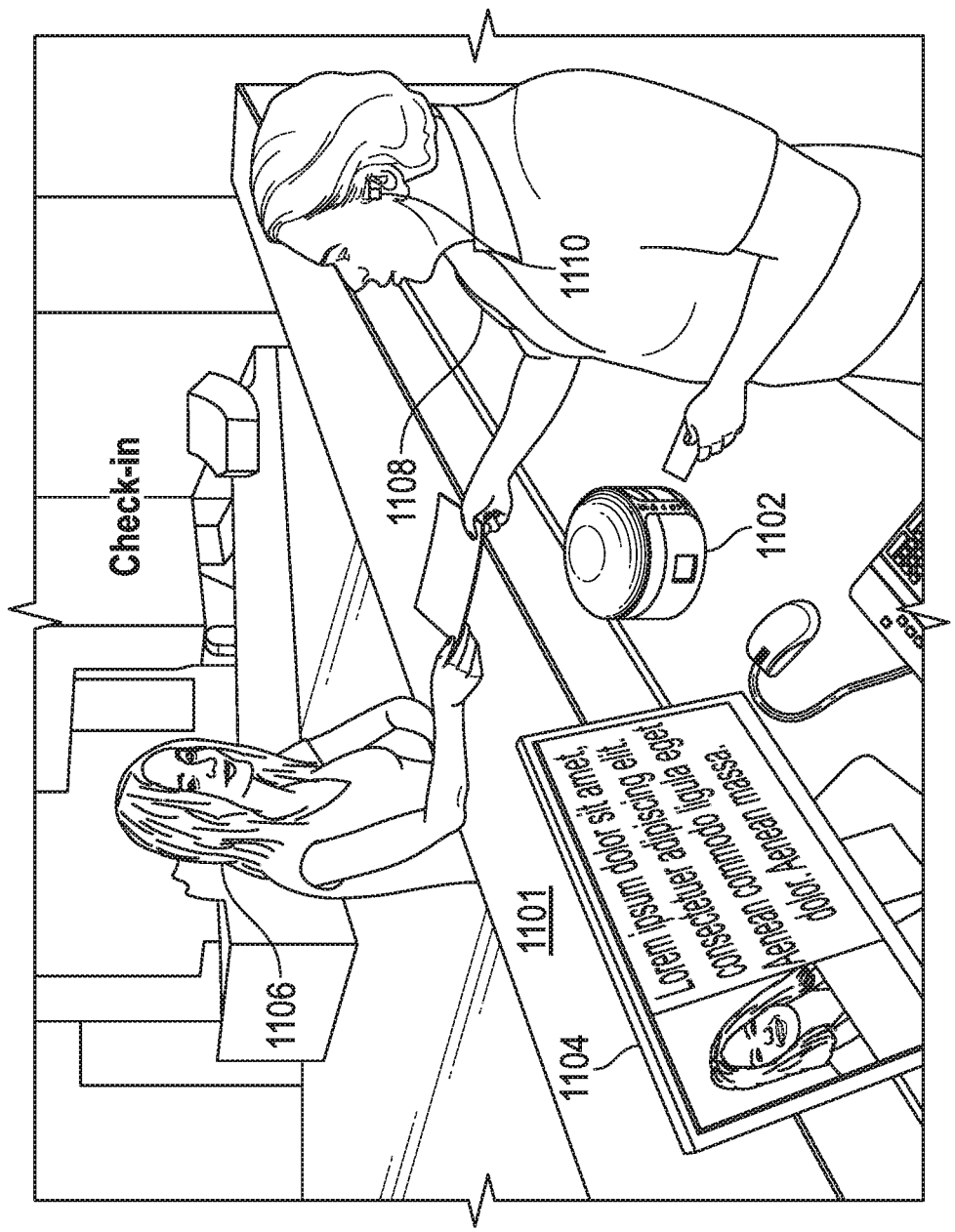
FIG. 11 is a schematic view of an alternative embodiment of a base module, illustrating a hotel employee addressing a guest by name based on real time location tracking in accordance with various embodiments delivering a more welcoming and personalized experience.

FIG. 11 is a schematic view of a front desk 1101 equipped with a base module 1102 configured to communicate with or embody a display 1104. In the illustrated embodiment, as a guest 1106 approaches a hotel employee 1108, the guest's location is tracked by the system, and the guest's name may displayed on the screen 1104, or spoken to the employee through an ear piece 1110. In this way, the employee may address the guest by name using on real time location tracking data.

Figure 12:
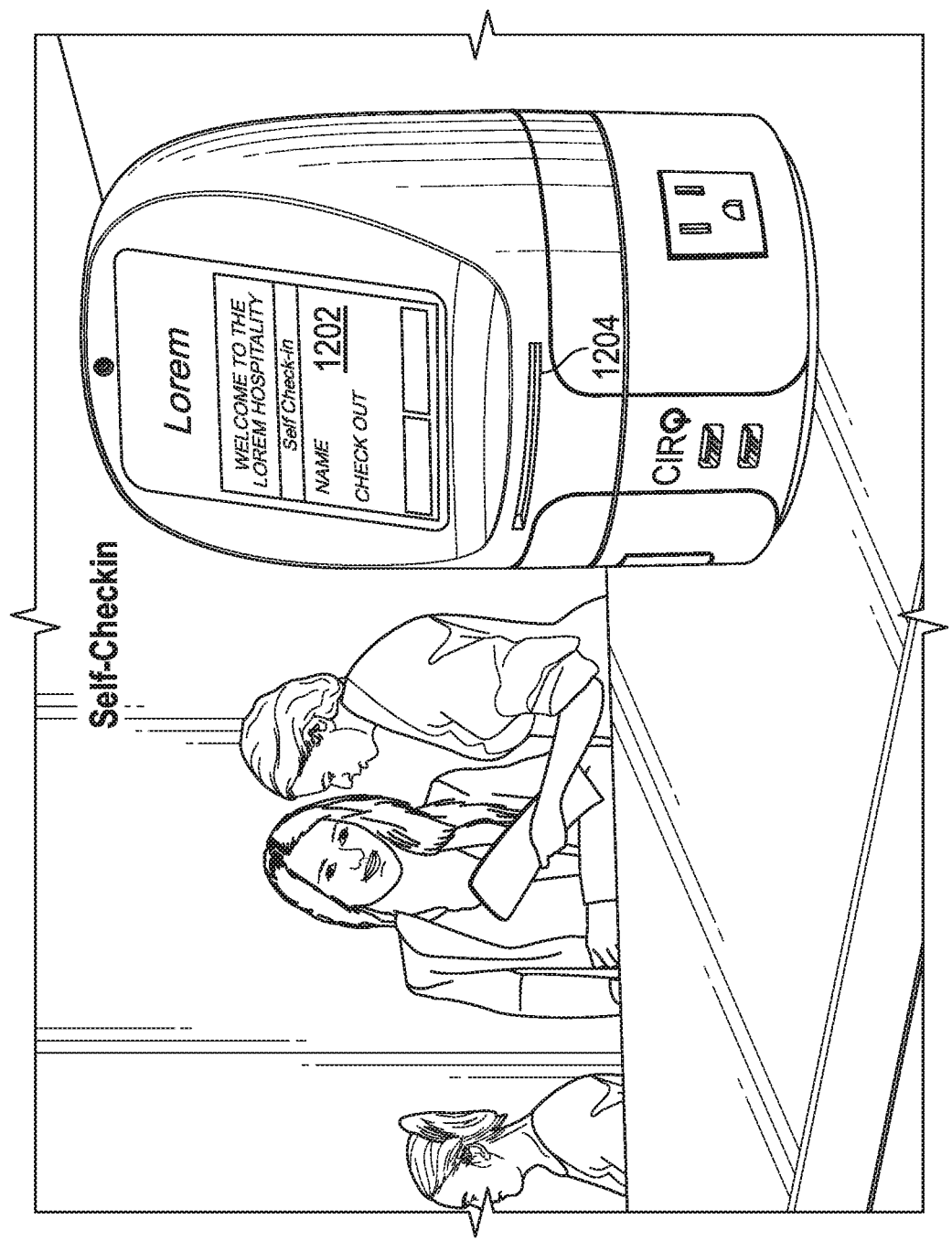
FIG. 12 is a schematic view of an alternative embodiment of a base module illustrating a self check-in and check-out system in accordance with various embodiments.

FIG. 12 is a schematic view of an alternative embodiment of a base module illustrating a self check-in and check-out module system allowing guests to perform self-registration and check-in into the property without having to directly interact with a property owner staff or employee, expediting their access to the purchased room. The illustrated embodiment includes a user interface, a display 1202, and a key card maker and credit card reader 1204.

Figure 13:
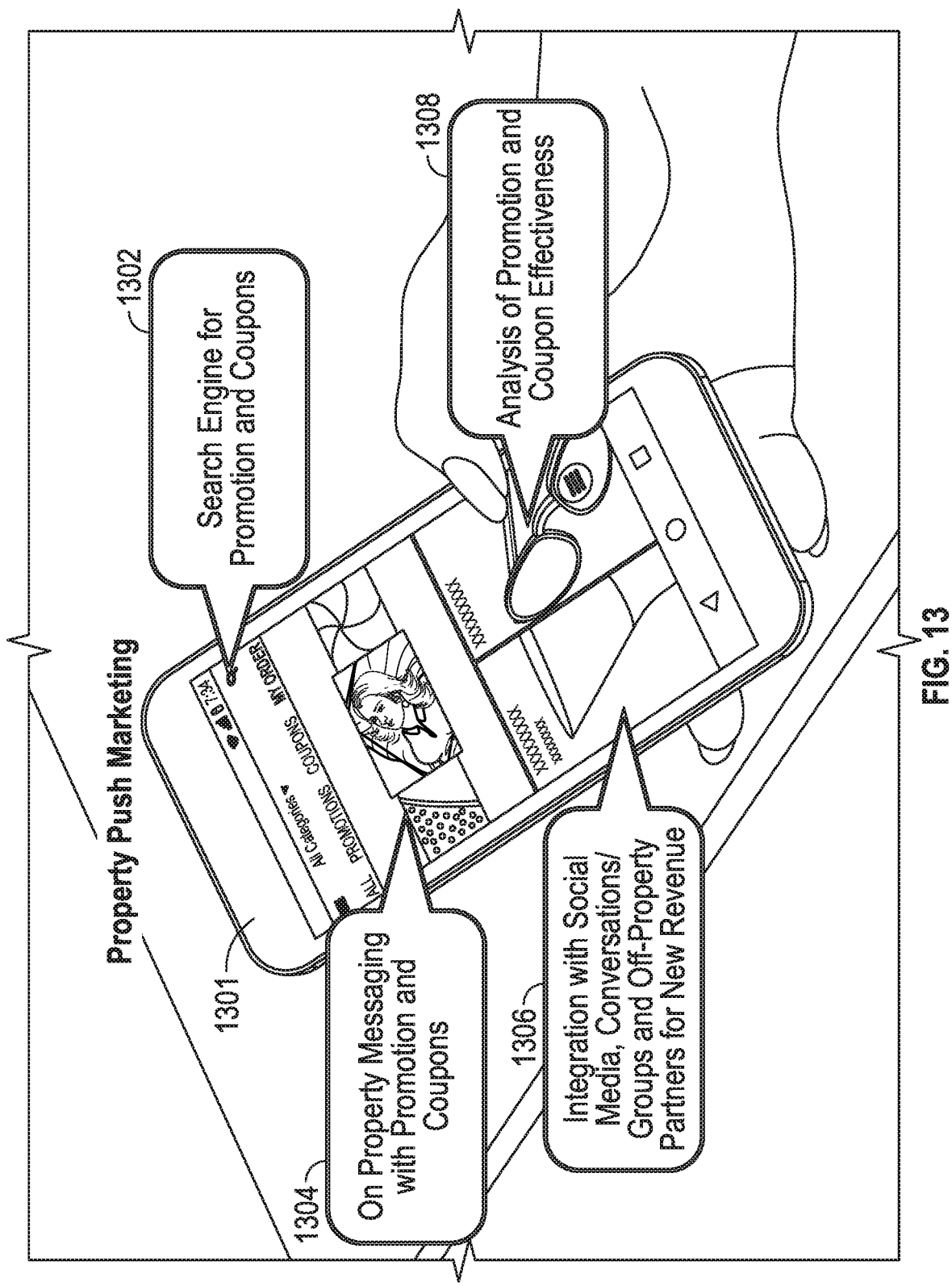
FIG. 13 is a screen display of a mobile app operating on a smart phone illustrating targeted marketing vectors in accordance with various embodiments.

FIG. 13 is an exemplary guest smart phone 1301 running a mobile app configured to display a property specific search feature 1302 for services, searching promotions, upgrades, and incentives, a proprietary (on property) messaging portal 1304 for receiving notices, offers, promotions and messages, an integrated social media portal 1306, and an analytics portal 1308.

Various embodiments of the present invention remote thermostatic control of an in-room heating, ventilation, and air conditioning (HVAC) unit such as a packaged terminal air conditioner (PTAC). PTACs are typically single, commercial grade, self-contained units installed through or inside a wall or window of a hotel guest room. A PTAC's compressor system both cools and heats. To cool, the units compressor pumps refrigerant to cool the coils which attracts heat and humidity which is then exhausted to the outside. To heat, this functionality is reversed. The refrigerant is used to heat the coils, and when air passes over it the unit pushes the heated air into the room. PTACs are larger than a typical through-the-wall air conditioner.

Figure 14:
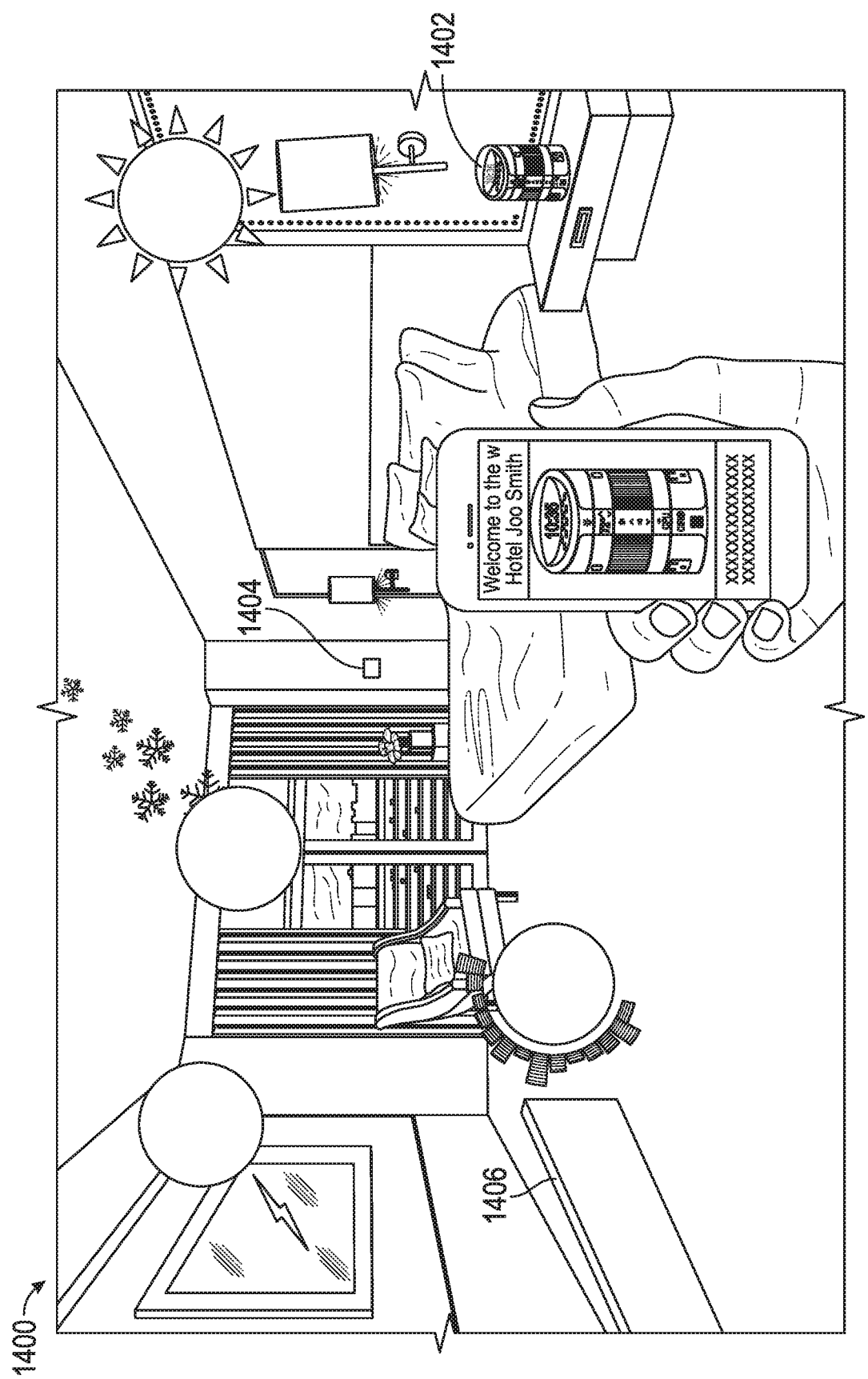
FIG. 14 is a schematic diagram of an in-room IOT module configured to wirelessly communicate with a relay which replaces a conventional wall-mounted thermostat to thereby control an in-room heating, ventilation, and air conditioning (HVAC) unit such as a packaged terminal air conditioner (PTAC) in accordance with various embodiments.

With continued reference to FIGS. 5-10 and also referring now to FIG. 14, a remote thermostatic control system 1400 includes an in-room IOT module 1402, a relay 1404 designed to replace a conventional wall-mounted thermostat (not shown), and an HVAC unit 1406 (e.g., a PTAC). In the illustrated embodiment, the IOT module 1402 includes a thermostat controller operable by the user to remotely (e.g., wirelessly) control the state of the relay 1404 which, in turn, operates the PTAC 1406 in much the same way (typically a wired connection) as the wall mounted thermostat previously did so before being replaced (or augmented) by the relay.

Figure 15:
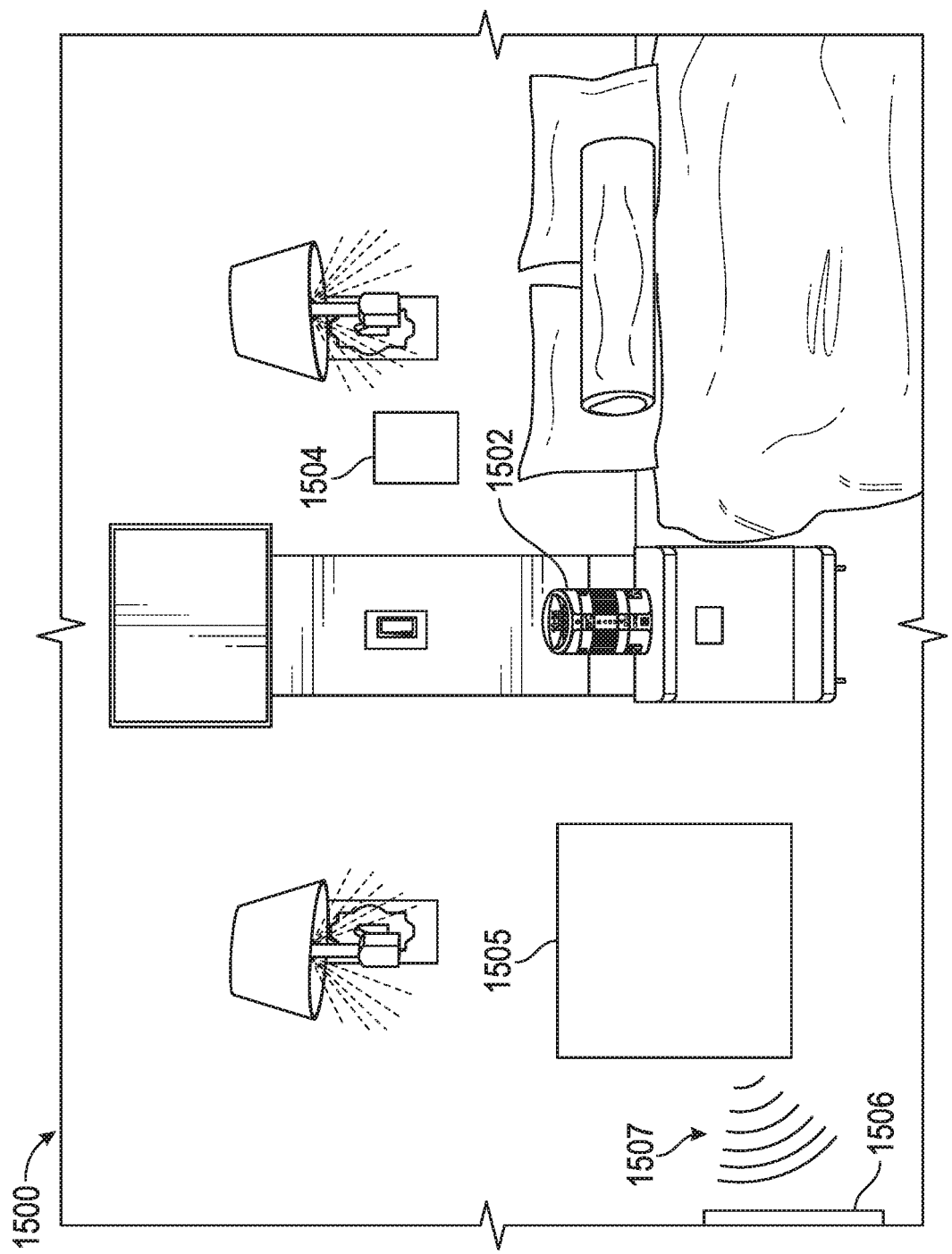
FIG. 15 is schematic diagram of an in-room IOT module configured to wirelessly communicate with a secondary wireless module which wirelessly controls a PTAC unit in accordance with various embodiments.

In an alternate embodiment, FIG. 15 depicts a remote thermostatic control system 1500 including an IOT module 1502 and other in-room connected array of sensors configured to communicate (e.g., wirelessly) with one or more secondary wireless modules 1504, 1505, and an HVAC unit 1506 (e.g., a PTAC). In the embodiment shown in FIG. 15, the IOT module 1502 includes a thermostat module which transmits (e.g., wirelessly) a desired temperature setting (e.g., set point) to one or both of the secondary wireless modules 1504, 1505 to thereby operate (e.g., wirelessly 1507) the PTAC 1506. In one embodiment, the user controls the PTAC 1506 using a handheld device 1504 (e.g., mobile phone, laptop, or other remote control device) which optionally displays a graphical user interface. In an alternate embodiment, the user may control the PTAC 1506 using a large screen display (e.g., computer monitor or television) which optionally displays a graphical user interface.

The embodiments described in conjunction with FIGS. 14 and 15 are particularly advantageous in that the temperature sensor associated with the thermostatic control system may reside within the bedside or table top IOT module removed from the wall. In either case, the sensed temperature corresponds to the temperature proximate the hotel guest, particularly whilst the guest is sleeping. This allows the system to more precisely control the relevant temperature, ensuring thermal comfort while conserving electricity by avoiding unnecessarily heating or cooling regions of the guest room not occupied by the guest.

Figure 16:
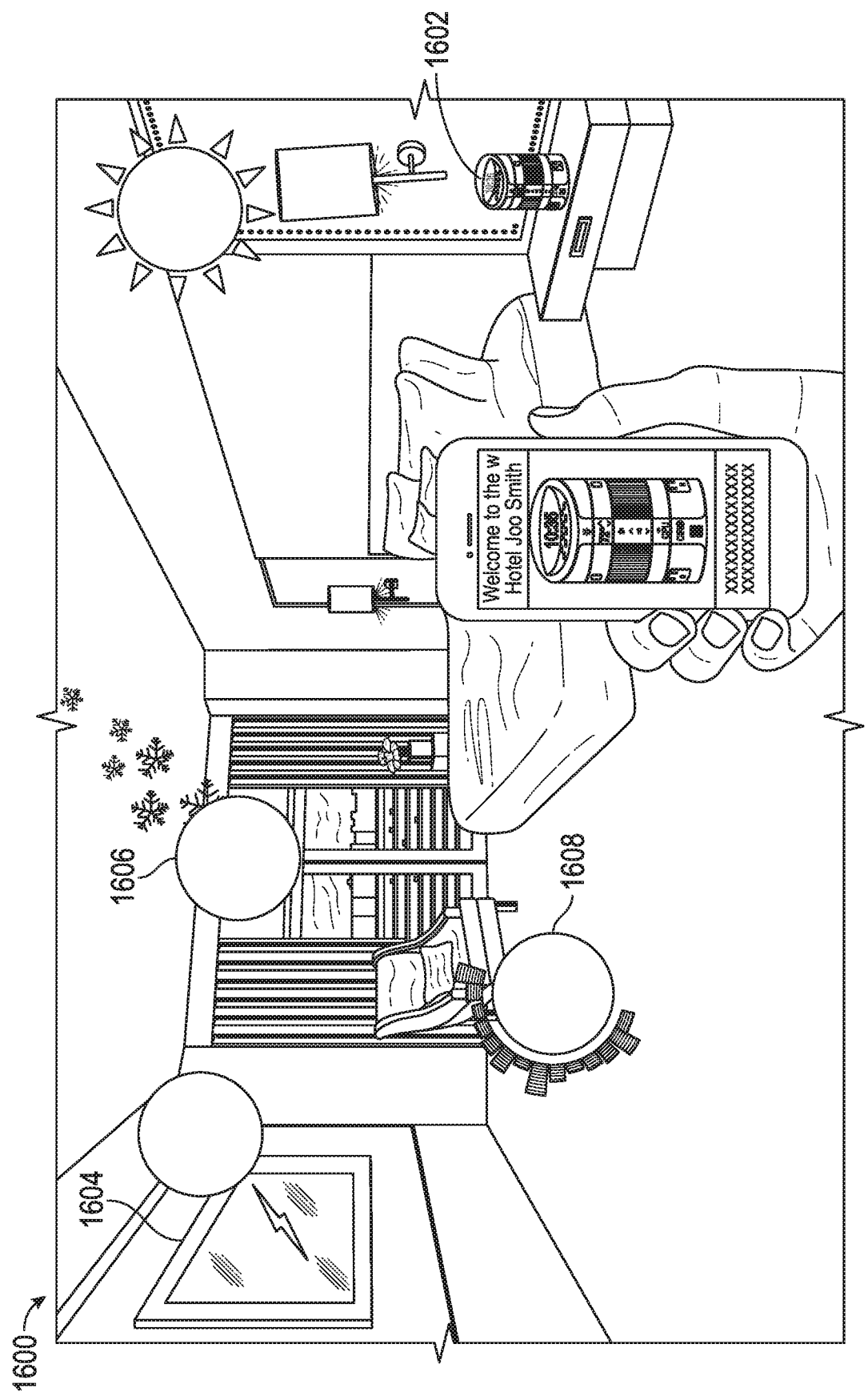
FIG. 16 is a schematic diagram of an in-room IOT module wirelessly coupled to a plurality of distributed sensors for monitoring motion and thermal zones in accordance with various embodiments.

Referring now to FIG. 16, a distributed monitoring and sensing system 1600 includes an in-room IOT module 1602 coupled (e.g., wirelessly) to a plurality of distributed sensors 1604, 1606, 1608 equipped to monitor motion and/or temperature at a plurality of zones. For example, a first sensor 1604 may detect the temperature (or other environmental conditions such as smoke, carbon monoxide, brightness level, sound, and/or humidity) as well as the presence of or motion of people (or pets) in a region of the room remote from the bedroom. A second sensor 1606 may be configured to monitor one or more of the foregoing parameters proximate a balcony or window. A third sensor 1608 may be configured to monitor one or more of the foregoing parameters proximate a sitting area, an additional room, or other strategic location within the guest suite.

In accordance with the foregoing embodiments, by monitoring environmental parameters and the presence or motion of people at various locations within the living quarters, the system may precisely monitor and/or control energy and other resource consumption. By way of non-limiting example, the system may be configured to open or close window curtains or blinds in coordination with sunrise, sunset, and overcast conditions to thereby influence temperature control within the entire room or within discreet zones. Moreover, the system may optimize temperature, other environmental conditions, or the use of electronic devices as people migrate into and out of the living quarters or sub-zones thereof. The system will also allow for guest to migrate their personal preferences from property to property.

In accordance with further embodiments, the in-room IOT module and/or the underlying operating platform may include incentive, reward, or point based components configured to gamify energy conservation objectives. For example, the system may be configured to compile individual guest and/or aggregate data surrounding consumption of electricity, gas, cold water, hot water, towel and bed linen usage, and other consumables. By establishing usage targets or thresholds, hotel guests may earn loyalty credits or other redeemable points in a gamified context, while at the same time promoting "green" conservation policies.

In an embodiment, cellular data to and from the guest mobile device may be routed thru the CIRQ cloud 106 back to the hotel chain server 108 (See FIG. 1). Various use cases enabled by the system share the following features: i) a PaaS System; ii) an in-room IOT control hub module which communicates with the mobile app and various edge devices and hotel services (food, drinks); and iii) tracking of guest location in the CIRQ cloud. The integration of the in-room IOT network with guest tracking data gives rise to a vast array of novel features, use cases, and anecdotal attributes, including the following non-limiting examples.

In a typical swimming pool, beach, golf course, concert venue, or other resort environment having multiple potential guest locations (e.g., bar stools, tables, cabanas, chaise lounges, stadium seats), location awareness allows the server to walk a straight line to bring the correct drink or food order directly to the right guest.

Predictive analytics may be used in conjunction with tracking data. For example, if a guest returns to the guest room at the same time (e.g., 6:00 p.m.) several days in a row, the system may begin pre-cooling the room in anticipation of the guest returning, for example at 5:45 p.m. The system may be configured to fully cool the room when the guest actually enters the geo-fence surrounding the hotel property.

When a guest returns to a particular city, the system can recommend the same or similar restaurants based on previous visits to that city, or even monitor the guest's restaurant reviews (e.g., Yelp) to see how well the guest liked the food and/or venue, and make recommendations accordingly.

Targeted marketing can be in the form of a wrapper around newspaper left in the room or outside the room door. Alternatively, targeted marketing may take the form of text messages (e.g., SMS), notices and offers, or a short video displayed on the in-room television when turned on by the guest.

When incenting a guest to enable location services, for example in the context of a rewards program or an enhanced gamification opportunity, the system may be configured to offer enhanced (e.g. double) points or other incentives for qualified purchases if the location service is enabled, and further enhanced (e.g., tripled) points or other incentives if the guest allows ads to be pushed to their smart phone. Additionally the gamification feature may allow guests to receive additional incentives for limiting their power usage in the room (e.g., turning off lights, adjusting the temperature higher while away from the room, using towels/linens for more than one day, limiting water usage in the shower, faucet, and other water interfaces.

As an additional revenue source, the restaurants or other venues, for example through partnerships or by sponsoring targeted ads, may be required to pay the property owner (e.g., resort operator, hotel chain, time share aggregator) a percentage of payments for the privilege of pushing targeted ads to captive and presumably high income consumers (e.g., the members of a particular loyalty or rewards program) or guests that are using the mobile app for the first time which would make the guest feel more comfortable in the hotel and building loyalty for the hotel. Additionally, in return for presenting and redirecting the guest to off-property locations, restaurants and services, the hotel owner could receive a percentage of the transaction.

When location services detects that a guest is leaving the hotel property around dinner time, the system may be configured to push a contextually aware message to the guest's phone, such as a happy hour drink special at the hotel bar in an attempt to keep the guest on the property. If the guest accepts, the system can subsequently push an ad for a dinner special (e.g., a reduced price) at the hotel restaurant, for example if the guest remains in the bar more than 15 minutes.

Location awareness may be used to identify the name of guests as they approach the front desk, the bar, concierge, or any other venue, thereby allowing resort employees to address guests by name.

Location awareness may also be used to display guest names on a digital sign or other display (e.g., a welcome sign) as each guest approaches the sign. Moreover, location awareness may be used to determine which floor an elevator need to go to transport a guest to the correct room, effectively eliminating the need to press elevator buttons on premium floors.

Contextual awareness may involve the use of previous data to determine a particular guest's food allergies, liquor preferences (e.g., Bombay gin), and/or food preferences (e.g., gluten free options).

When incenting a guest to enable location services, for example in the context of a loyalty program, the system may be configured to award double points (or a 15% discount privilege) if the guest uses the app while on the property, and to award triple points (or a 30% discount privilege) for so long as the guest continues to enable the location service after leaving the property.

In an embodiment the guest can use the in-room module to control the local IOT devices even without downloading the app, but the guest can control the module with the mobile device if the guest downloads the app to the mobile device.

The system may be configured to link with Air B&B, Travelocity, or other travel related sites to gather a list of people going to a particular destination (e.g., San Diego) for a particular purpose (e.g., to stay at a timeshare) during a particular time period (e.g., next week), and send contextually aware targeted ads to the entire group; that is, since they are staying at a timeshare, the system presumes they are leisure travelers (as opposed to business) and can send targeted ads promoting a leisure attraction, such as SeaWorld.

Although preferred embodiments are described in the context of hotel room, those skilled in the art will appreciate that IOT control modules may be installed in any number of environments such as Air B&B rentals, condominium communities, and the like.

In an embodiment, the in-room IOT module may be configured to remotely control an access feature such as a door lock, where the guest can use the mobile app to configure access preferences, such as sending a unique code in an SMS message, or using tracking to unlock the door when the guest is within a predetermined distance (e.g., ten feet) from the door. After check out, the system can send a different code to the next guest, and yet another code to housekeeping personnel. The system can also provide security alerts advising the guest that someone entered the room such as room housekeeping, maintenance or property management.

In another embodiment, the hotel facilities manager can remotely lock, unlock, check the locked status, or change the access code for IOT connected room door locks.

When incenting a guest to enable location services, the system may be configured to offer premium movie channels, Hulu-type streaming or music services, or complimentary nightclub passes (based on guest demographics).

In other embodiments the guest can select a desired perk (incentive) in exchange for enabling location services, where the perks are harvested from aggregate data (e.g., where do people in this age bracket or other demographic metric tend to dine, are they motivated by discounts, drink specials, enhanced reward points, iTunes credits).

The system may also use aggregate location data to dynamically allocate personnel and resources in real time. For example, as more guest go to the bar, pool, restaurant, or conference center, hotel management can allocate and dispatch service additional personnel as needed.

In another embodiment, the system can be configured to use tracking data to identify approaching guests, and to discretely speak the guest names into a hotel employee's ear piece to thereby allow the employee to address the guest by name.

In various embodiments, the mobile device communicates with the in-room IOT controller via Bluetooth or other protocol while the guest is in the room, but when the guest leaves the room the app can transition so that the mobile app send location data directly with the CIRQ cloud.

In various embodiments, the system may be configured to monitor the room with a motion sensor in addition to or in lieu of location tracking to determine when the room is vacant and the temperature can be adjusted, fans and television turned off, and lights dimmed. In addition, room occupancy detection and analysis allows the system to ignore incidental or transient occupancy (e.g., by housekeeping or administrative personnel) and to forego turning on the air conditioning when hotel staff are in the room but the guest is absent from the room.

In an embodiment, the in-room IOT control system includes a thermostat control module which may be disposed bedside or on a table inside the room. In this way, the guest may adjust the room temperature from their bed without having getting up. In addition, the thermostat control module may be configured to transmit a wireless control signal to a wall mounted relay receiver which, in turn, communicates the control signal to an IOT relay which interfaces with the building HVAC system. Alternatively, the guest can adjust the room temperature using the mobile app to control the remote thermostat.

In an embodiment, as the guest is returning to the room but still outside the property geo-fence, the mobile app sends location data to the CIRQ cloud over cellular or Wi-Fi, whereupon the CIRQ cloud sends the data to the hotel property's server, which tells the in room device to anticipatorily adjust environmental controls; when the guest enters the room, the phone switches to Bluetooth communication with the in-room IOT control module.

In various embodiments, the motion sensor, array of sensors and tracking feature can coordinate to record a log of how much time the guest spends sleeping, at on property venues (e.g., business center, hotel bar), and at off property venues, and infer leisure and spending trends from aggregate location and occupancy data.

A system is thus provided for customizing a hotel, timeshare, apartment complex or rental property (collectively referred to as "hotel room") experience. The system includes: a PaaS system with an in-room IOT network control module configured to control a plurality of IOT connected mechanical and/or electrical devices such as, for example, a thermostat, a door lock, lighting, electrical switches, HVAC systems, audio components, and sensors; a mobile app running on a guest mobile device, the mobile app configured to remotely control the IOT network control module; an enterprise server configured to communicate with the IOT network control module; and a hotel server configured to communicate with the API and enterprise server such that the enterprise server controls the transmission of data between the IOT network control module and the hotel server; wherein the enterprise server is configured to receive tracking data from the mobile app and to receive guest profile data from the API associated with the hotel server, and to cause the IOT network control module to adjust at least one of the IOT devices (e.g., thermostat and door lock) based on the tracking data and the guest profile data.

In an embodiment, the mobile app is configured to prompt the guest to select at least one of: a first incentive conditioned upon the guest entering a user profile in the mobile app; and a second incentive conditioned upon the guest enabling location services for a first time period corresponding to the anticipated duration of the hotel stay.

In an embodiment, the mobile app is further configured to prompt the guest to select at least one of: a third incentive conditioned upon the guest consenting to receive targeted ads; and a fourth incentive conditioned upon the guest enabling location services for a second time period exceeding the anticipated duration of the hotel stay.

In an embodiment, at least one of the first, second, third, and fourth incentives comprise one of: enhanced loyalty points for authorized purchases; discounted prices for purchases of authorized products; discounted prices for purchases of authorized services; audio streaming service credits; and video streaming service credits.

In an embodiment, the guest profile data comprises a desired temperature value; the tracking data comprises a determination that the guest is approaching the hotel room; and the enterprise server is configured to cause the IOT network control module to adjust the thermostat to the desired temperature value in response to determining that the guest is approaching the hotel room.

In an embodiment, determining that the guest is approaching the hotel room comprises detecting when the guest breaches a first predetermined geo-fence boundary.

In an embodiment, the guest profile data further comprises a desired access protocol; and the enterprise server is configured to cause the IOT network control module to implement the desired access protocol in response to the guest breaching a second predetermined geo-fence boundary.

In an embodiment, the desired access protocol comprises automatically unlocking the door lock; and the second predetermined geo-fence boundary is in the range of about two to twenty feet.

In an embodiment, the guest profile data comprises an indication that the guest is on vacation; the tracking data indicates that the guest of outside the hotel property; and the enterprise server is configured to transmit a targeted ad to the guest mobile phone via the mobile app, the targeted ad corresponding to a tourist attraction.

In an embodiment, the guest profile data further comprises demographic information including indicia of the guest's age range; and the tourist attraction is age appropriate for the guest's age range.

In an embodiment, the guest profile data comprises the guest's surname; the tracking data comprises a determination that the guest is approaching a hotel employee; and the enterprise server is configured to cause the hotel server to provide the guest surname to the employee in response to the guest approaching the employee.

In an embodiment, providing the guest surname to the employee comprises at least one of: i) speaking the guest surname into an earpiece configured to be worn by the employee; and ii) displaying the guest surname on a screen visible to the employee.

In an embodiment, the mobile app is configured to communicate with the IOT network control module when the guest mobile device is proximate the guest hotel room; and the mobile app is configured to communicate with the enterprise server when the guest mobile device is remote from the guest hotel room.

In an embodiment, when the guest mobile device is in the guest room and the mobile app sends a food service request, the system is configured to transmit the food service request to the IOT network control module, and the enterprise server is configured to receive the food service request from the IOT network control module and cause the hotel server to transmit the food service request to a hotel employee to be fulfilled; and when the guest mobile device is remote from the guest room but within a first geo-fence bordering the hotel property and the mobile app sends a food service request, the system is configured to transmit the food service request to the to the enterprise server, whereupon the enterprise server is configured to cause the hotel server to transmit the food service request to a hotel employee to be fulfilled.

A method is also provided for reducing energy consumption in a hotel room. The method includes the steps of: configuring a control module disposed within the hotel room to wirelessly communicate with: i) a remote thermostat located on a table next to a bed or in a location central to the room (e.g., other than a wall mounted device), a thermostat relay located within the hotel room having a wireless controller that communicates with an HVAC system; and ii) a mobile app operating on a mobile device carried by the guest; using the mobile app, obtaining consent from the guest to track the guest's location; using the mobile app, setting the thermostat to a first temperature value in response to determining that the guest has left the hotel room; using the mobile app, maintaining the thermostat at the first temperature value for so long as the guest is at least a predetermined distance away from the hotel room; and using the mobile app, setting the thermostat to a second temperature value in response to determining that the guest is traveling back to the hotel room.

In an embodiment, determining that the guest has left the hotel room comprises at least one of location tracking and motion sensing.

In an embodiment, the mobile device comprises one of a phone, a watch, and a wearable device.

In an embodiment, the mobile device includes a native GPS module, and the mobile app is configured to access the GPS module to retrieve location data.

In an embodiment, the method further includes: configuring the control module to wirelessly communicate with a motorized window covering; and using the mobile app, instructing the control module to close the window covering for so long as the guest is at least said predetermined distance away from the hotel room.

In an embodiment, the method further includes: using the mobile app, instructing the control module to open the window covering in response to determining that the guest is traveling back to the hotel room.

In an embodiment the modular IOT devices may be configured to incorporate artificial intelligence such as through voice activation allowing the guest to order services or communicate with the hotel staff directly.

In an embodiment the IOT control system may be of modular construction allowing for rapid servicing if a module needs replacement or upgrade, minimizing the down time during repair/upgrade. Additionally the system may be configured to deliver an environmentally friendly solution that will not become obsolete due to its modular construction and flexibility for replacement and upgrades.

In the context of this disclosure, the terms hotel server and hotel enterprise server may contemplate on-premises or off-premises servers or other computing devices that monitor and/or controls that property. In this regard, many AirBnB type customers and smaller hotels may not have a server on the premises, yet the present disclosure contemplates these locations inasmuch as they may nonetheless communicate with an off-premises server. Such configurations may benefit from an appropriate API for communicating information and analytics between the off premises server and the in room IOT controller.

In the context of this disclosure, the term guest profile data may include, in addition to or in lieu of tourism, information pertaining to business travel, conferences, governmental and educational activities, and the like.

The present disclosure further contemplates providing cross-domain context awareness for data and events that occur on the property which can be used for optimizing the guest or property owner experience.

The foregoing description is considered as illustrative only of the principles of the invention. Further, since numerous modifications and changes will readily occur to those skilled in the art, it is not desired to limit the invention to the exact construction and process shown and described above. Accordingly, all suitable modifications and equivalents may be considered as falling within the scope of the invention.

Embedded capabilities to create thermal mapping and imaging of contained rooms to create a temperature profile and map to better adjust the temperature within the space.

Embedded sensors within the modular system and/or embedded infrastructure sensors that develop motion map of guest movement and habits within the contained room or space.

The invention claimed is:

1. A method of reducing energy consumption in a hotel room, comprising the steps of:
providing a packaged terminal air conditioner unit configured to selectively heat and cool the hotel room, and a wall-mounted relay configured to control a temperature setting associated with the packaged terminal air conditioner unit;
providing an in-room internet-of-things (IOT) module comprising a thermostat controller operable by a user to wirelessly control a temperature setting of the wall mounted relay;

installing, on a mobile device associated with the user, a mobile app configured to communicate with the thermostat controller;

defining, with the mobile app, a user profile comprising temperature preferences, and to selectively download the user profile to the IOT module; and providing an enterprise server including an API configured to communicate with the IOT module, the enterprise server being configured to receive the user profile and location tracking data from the mobile app, and to cause the IOT module to automatically adjust the temperature of the room based on the location tracking data and the user profile.

2. The method according to claim 1, wherein:

the mobile app communicates with the IOT module when the user mobile device is proximate the at least one room; and the mobile app communicates with the API of the enterprise server when the user mobile device is remote from the at least one room.

3. The method of according to claim 1, wherein the enterprise server causes the IOT module to adjust the thermostat controller to a desired temperature value in response to a determination that the user is approaching the at least one room based on the location tracking data.

4. The method of claim 3, wherein the determination that the user is approaching the at least one room comprises detecting when the user breaches a first predetermined geo-fence boundary.

5. The method according to claim 3, wherein the user profile further includes user preferences for at least one of lighting, window shade position, and entertainment.

6. The method according to claim 1, further including automatically downloading the user profile to the IOT module upon a pairing of the user mobile device to the IOT module.

7. The method according to claim 1, wherein the IOT module controls at least one other peripheral network device in the hotel room, the device selected from: lights, a television, a wireless router, a radio, a telephone, motorized window shades, a water meter, a door lock, and an embedded building infrastructure sensor.

8. The method according to claim 1, further including tracking the mobile device and providing the location tracking data to an enterprise server to thereby actuate the door lock when the guest's mobile device is proximate the sensor and an enabling code is entered into the mobile app.

9. A remote thermostatic control system comprising:

a packaged terminal air conditioner unit configured to selectively heat and cool a room;

a wall mounted relay configured to control a temperature setting associated with the packaged terminal air conditioner unit;

an in-room internet-of-things (IOT) module comprising a thermostat controller operable by a user to wirelessly control temperature setting of the wall mounted relay; and a mobile app running on a hand held mobile device, the mobile app configured to define a user profile comprising temperature preferences, selectively download the user profile to the IOT module, and communicate with the thermostat controller to thereby control the temperature of the room; and an enterprise server including an API configured to communicate with the IOT module, the enterprise server being configured to receive the user profile and location tracking data from the mobile app, and to cause the IOT module to automatically adjust the temperature of the room based on the location tracking data and the user profile.

10. The system according to claim 9, wherein the user profile further includes preferences for lighting, window shade position, and entertainment.

11. The system according to claim 9, wherein the TOT network control module is configured to receive the location tracking data from the enterprise server and adjust one or more environmental factors in the hotel room to conform to the guest's profile.

12. The system according to claim 9, further comprising a sensor configured to track the guest's mobile device and provide the location tracking data to the enterprise server, to thereby actuate the door lock when the guest's mobile device is proximate the sensor and an enabling code is entered into the mobile app.

13. The system according to claim 9, wherein:

the user profile comprises a desired temperature value; and the enterprise server is configured to cause the IOT module to adjust the thermostat controller to the desired temperature value in response to a determination that the user is approaching the at least one room based on the location tracking data.

14. The system according to claim 13, wherein the determination that the user is approaching the at least one room comprises detecting when the user breaches a first predetermined geo-fence boundary.

15. The system according to claim 14, wherein:

the mobile app is configured to communicate with the IOT module when the user mobile device is proximate the at least one room; and the mobile app is configured to communicate with the API of the enterprise server when the user mobile device is remote from the at least one room.

16. The system according to claim 15, wherein the mobile app is configured to automatically download the user profile to the IOT module upon a pairing of the user mobile device to the IOT module.

17. The system according to claim 9, wherein the IOT module is further configured to control at least one other peripheral network device in the room, the device selected from: lights, a television, a wifi router, a radio, a telephone, motorized window shades, a water meter, a door lock, and an embedded building infrastructure sensor.

* * * * *